United States Patent
Barrios et al.

(10) Patent No.: US 9,694,785 B1
(45) Date of Patent: Jul. 4, 2017

(54) WIRELESS VEHICLE SECURITY MOTION SENSOR AND RELATED METHODS

(71) Applicant: Omega Research and Development Technologies, LLC, Hauppauge, NY (US)

(72) Inventors: Hircio Javier Barrios, Miami, FL (US); Michael Stephen Thompson, Lithia Springs, GA (US)

(73) Assignee: OMEGA RESEARCH AND DEVELOPMENT TECHNOLOGIES, LLC, Hauppauge, NY (US)

( * ) Notice: Subject to any disclaimer, the term of this patent is extended or adjusted under 35 U.S.C. 154(b) by 0 days.

(21) Appl. No.: 15/190,789

(22) Filed: Jun. 23, 2016

Related U.S. Application Data

(60) Provisional application No. 62/273,524, filed on Dec. 31, 2015.

(51) Int. Cl.
*B60R 25/10* (2013.01)
*B60R 25/24* (2013.01)

(52) U.S. Cl.
CPC ........ *B60R 25/1004* (2013.01); *B60R 25/248* (2013.01); *B60R 2025/1016* (2013.01); *B60R 2325/101* (2013.01); *B60R 2325/105* (2013.01)

(58) Field of Classification Search
CPC ..... B60R 25/04; B60R 25/102; B60R 25/104; B60R 25/1004; B60R 25/248; B60R 2025/1016; B60R 2325/101; B60R 2325/105; B60R 2325/202; B60R 2325/205
See application file for complete search history.

(56) References Cited

U.S. PATENT DOCUMENTS

| 5,990,786 A | 11/1999 | Issa et al. |
| 8,350,669 B2 | 1/2013 | Magner et al. |
| 9,063,833 B2 | 6/2015 | Malone et al. |
| 9,452,732 B1 * | 9/2016 | Hermann ................ B60R 25/10 |
| 2002/0008644 A1 * | 1/2002 | Flick ...................... B60R 25/04 340/988 |
| 2002/0013660 A1 * | 1/2002 | Flick ...................... B60R 25/04 701/519 |

(Continued)

*Primary Examiner* — Orlando Bousono
(74) *Attorney, Agent, or Firm* — Allen, Dyer, Doppelt & Gilchrist, P.A.

(57) ABSTRACT

A vehicle security system may include a vehicle controller and a first wireless communications device carried by the vehicle, and a wireless security sensor(s). The wireless security sensor(s) may include a portable housing, a motion sensor carried by the portable housing to detect motion thereof, a second wireless communications device carried by the portable housing to communicate with the first wireless communications device, and a sensor controller carried by the portable housing. The sensor controller may cooperate with the motion sensor and the second wireless communications device to determine when motion of the portable housing exceeds a first security alert threshold and send a first security alert message to the vehicle controller based thereon, and determine when the first security alert threshold is exceeded for a predetermined time and enter a power saving mode. The vehicle controller may generate a first alarm responsive to the first security alert message.

26 Claims, 6 Drawing Sheets

(56) References Cited

U.S. PATENT DOCUMENTS

| | | | | |
|---|---|---|---|---|
| 2002/0014977 A1* | 2/2002 | Flick | ..................... | B60R 25/04 340/988 |
| 2002/0014978 A1* | 2/2002 | Flick | ..................... | B60R 25/04 340/988 |
| 2002/0016673 A1* | 2/2002 | Flick | ..................... | B60R 25/04 701/484 |
| 2002/0021242 A1* | 2/2002 | Flick | ..................... | B60R 25/04 342/357.395 |
| 2002/0101365 A1* | 8/2002 | Flick | ..................... | B60R 25/04 340/988 |
| 2002/0101366 A1* | 8/2002 | Flick | ..................... | B60R 25/04 340/988 |
| 2002/0105443 A1* | 8/2002 | Flick | ..................... | B60R 25/04 340/988 |
| 2002/0105444 A1* | 8/2002 | Flick | ..................... | B60R 25/04 340/988 |
| 2002/0154034 A1* | 10/2002 | Flick | ..................... | B60R 25/04 340/988 |
| 2002/0154035 A1* | 10/2002 | Flick | ..................... | B60R 25/04 340/988 |
| 2002/0154036 A1* | 10/2002 | Flick | ..................... | B60R 25/04 340/988 |
| 2002/0156577 A1* | 10/2002 | Flick | ..................... | B60R 25/04 340/989 |
| 2002/0158777 A1* | 10/2002 | Flick | ..................... | B60R 25/04 340/988 |
| 2002/0158778 A1* | 10/2002 | Flick | ..................... | B60R 25/04 340/988 |
| 2002/0163449 A1* | 11/2002 | Flick | ..................... | B60R 25/04 340/988 |
| 2002/0190873 A1* | 12/2002 | Flick | ..................... | B60R 25/04 340/988 |
| 2003/0154027 A1* | 8/2003 | Flick | ..................... | B60R 25/04 701/468 |
| 2004/0201520 A1* | 10/2004 | Flick | ..................... | B60R 25/04 342/357.395 |
| 2005/0156716 A1* | 7/2005 | Flick | ..................... | B60R 25/04 340/426.19 |
| 2005/0156717 A1* | 7/2005 | Flick | ..................... | B60R 25/04 340/426.19 |
| 2005/0156718 A1* | 7/2005 | Flick | ..................... | B60R 25/04 340/426.19 |
| 2005/0156719 A1* | 7/2005 | Flick | ..................... | B60R 25/04 340/426.19 |
| 2005/0174220 A1* | 8/2005 | Flick | ..................... | B60R 25/04 340/426.18 |
| 2005/0190080 A1* | 9/2005 | Flick | ..................... | B60R 25/04 340/989 |
| 2007/0279283 A1* | 12/2007 | Flick | ..................... | B60R 25/04 342/357.31 |

* cited by examiner

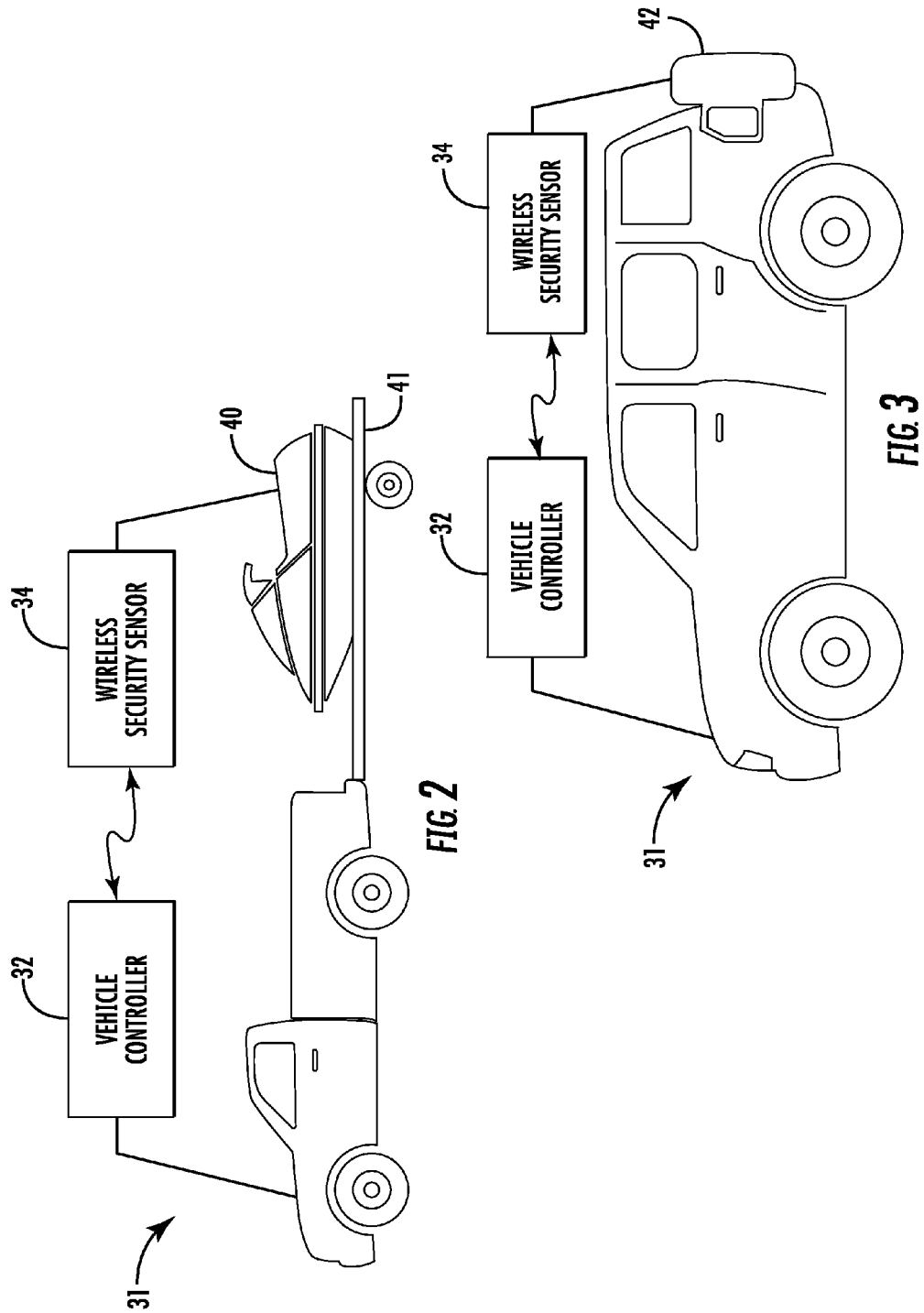

WIRELESS VEHICLE SECURITY MOTION SENSOR AND RELATED METHODS

RELATED APPLICATIONS

This application claims the benefit of U.S. provisional app. No. 62/273,524, filed Dec. 31, 2015, which is hereby incorporated herein in its entirety by reference.

TECHNICAL FIELD

This disclosure relates to vehicle security systems and, more particularly, to sensors for vehicle security systems and related methods.

BACKGROUND

Vehicle security systems are often installed in vehicles to detect break-ins or damage to the vehicle. Upon detection of such events, the vehicle security system may perform various actions, such as actuating a siren and/or vehicle horn, flashing lights, disabling the ignition system of the vehicle, and/or sending an alarm indication to a monitoring station or user (e.g., to a user's smart phone, for example).

In many instances, a vehicle controller may be used to perform more than just security operations. For example, a multi-function controller may be used to perform remote keyless entry (RKE). Once such system is provided in U.S. Pat. No. 9,063,833 to Malone et al., which is assigned to the present Assignee and is hereby incorporated herein in its entirety by reference. Malone et al. provides a portable transceiver for locking and locating an automobile that includes a remote keyless entry system for locking the automobile, and a locating device determining a location of the transceiver. The remote keyless entry system and the locating device are housed in a pocket sized housing. Furthermore, a processor derives directional information from a current location to a waypoint, and in response to an activation of the remote keyless entry system, the locating device determines the waypoint corresponding substantially to that of the automobile. The portable transceiver may also provide security control features, such as arming and disarming of a vehicle alarm.

Despite the advantages of such configurations, further enhancements may be desirable with respect to vehicle security systems and sensors in certain applications.

SUMMARY

A vehicle security system may include a vehicle controller carried by the vehicle, a first wireless communications device carried by the vehicle and coupled to the vehicle controller, and at least one wireless security sensor. The at least one wireless security sensor may include a portable housing, a motion sensor carried by the portable housing to detect motion thereof, a second wireless communications device carried by the portable housing to communicate with the first wireless communications device, and a sensor controller carried by the portable housing. The sensor controller may be configured to cooperate with the motion sensor and the second wireless communications device to determine when motion of the portable housing exceeds a first security alert threshold, and send a first security alert message to the vehicle controller based thereon, and determine when the first security alert threshold is exceeded for a predetermined time and enter a power saving mode based thereon. The at least one wireless security sensor may further include a battery carried by the portable housing and powering the motion sensor, second wireless communications device and sensor controller. The vehicle controller may generate a first alarm responsive to the first security alert message. Accordingly, the at least one wireless security sensor may advantageously provide enhanced security yet conserve battery power when the vehicle is moving, for example.

More particularly, the at least one wireless security sensor may have a unique identifier (UID) associated therewith. Moreover, the sensor controller may be switchable to a learning mode to send the UID to the vehicle controller. Also, the at least one wireless security sensor may comprise a plurality thereof, and the sensor controller may generate a low battery message including the UID of the associated wireless security sensor. As such, the vehicle controller may generate a unique low battery alert for each respective wireless security sensor based upon its UID.

The sensor controller may be further configured to determine when motion is above a second security alert threshold lower than the first security alert threshold, and send a second security alert message to the first wireless communications device based thereon. Also, the vehicle controller may be configured to generate a second alarm responsive to the second security alert message.

By way of example, the predetermined time may be greater than 2 seconds. Also by way of example, the motion sensor may comprise a three dimensional (3D) accelerometer, a tilt sensor, etc. Additionally, in some embodiments the at least one wireless security sensor may further include an inductive charging circuit carried by the portable housing and cooperating with the sensor controller to inductively charge the battery.

The vehicle controller may comprise at least one of a remote start controller, an alarm system controller, and a remote keyless entry controller, for example. By way of example, the first alarm may comprise at least one of a local audible alarm and a local visual alarm. In accordance with another example implementation, the first alarm may comprise a wireless alarm transmission.

A related wireless security sensor, such as the one described briefly above, is also provided. Furthermore, a related method for using a vehicle security system, such as the one described briefly above, is also provided. The method may include positioning at least one wireless security sensor at the vehicle, and using the sensor controller to determine when motion of the portable housing exceeds a first security alert threshold based upon the motion sensor and to send a first security alert message to the vehicle controller based thereon via the second wireless communications device. The method may further include using the sensor controller to determine when the first security alert threshold is exceeded for a predetermined time based upon the motion sensor, and enter a power saving mode based thereon. The method may also include generating a first alarm using the vehicle controller responsive to the first security alert message.

BRIEF DESCRIPTION OF THE DRAWINGS

FIG. 2 is a side view of a vehicle and associated trailer towing a personal watercraft to which the wireless security sensor of the system of FIG. 1 has been attached in accordance with an example embodiment.

FIG. 3 is a perspective view of a vehicle having a spare tire carried thereon to which the wireless security sensor of the system of FIG. 1 has been attached in accordance with an example embodiment.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
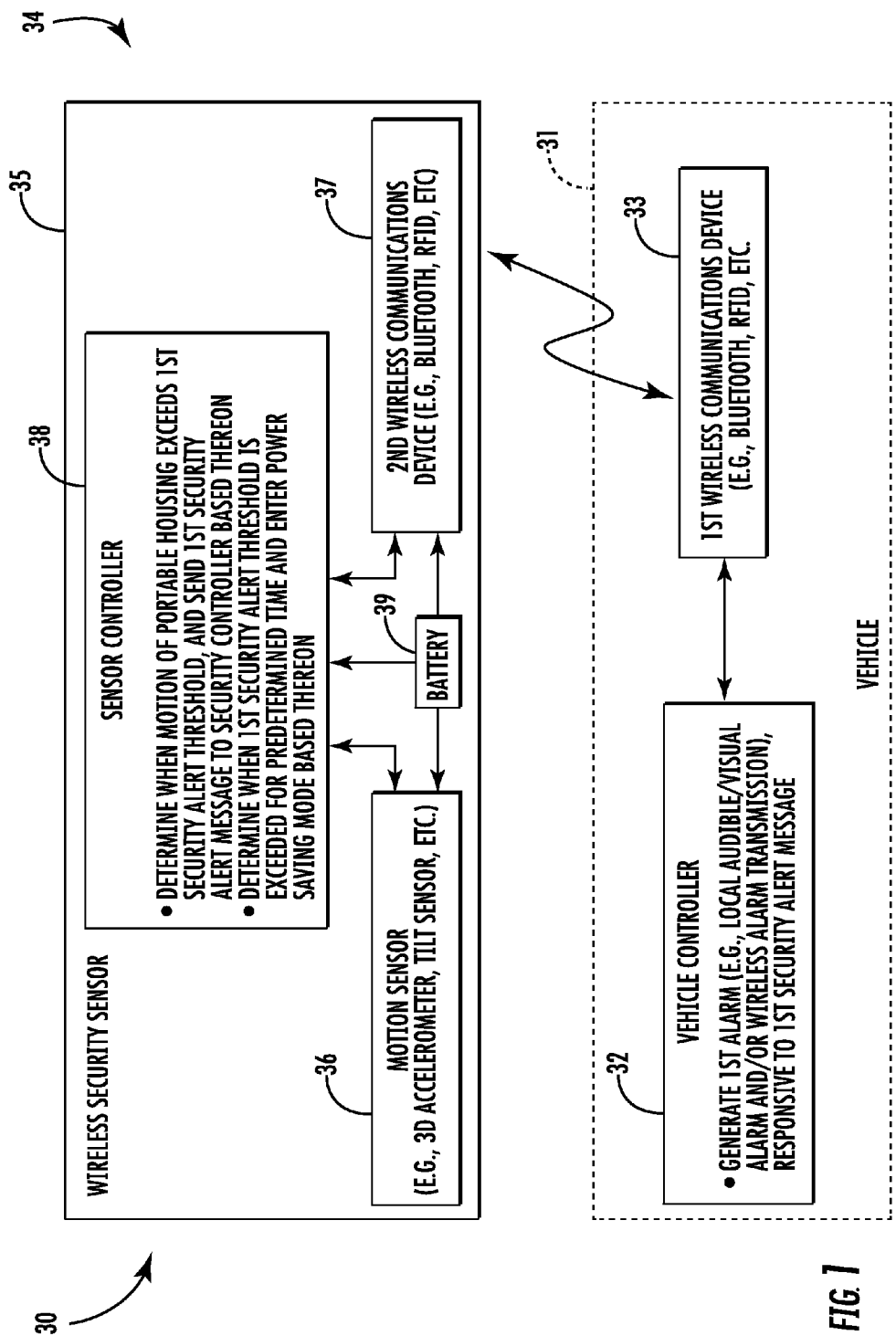
FIG. 1 is a schematic block diagram of a vehicle security system in accordance with an example embodiment.

Referring initially to FIG. 1, a vehicle security system 30 for a vehicle 31 is first described. The system 30 illustratively includes a vehicle controller 32 carried by the vehicle 31, as well as a first wireless communications device 33 carried by the vehicle and coupled to the vehicle controller. By way of example, the vehicle controller 32 may be implemented using appropriate hardware (e.g., a microprocessor, etc.) and associated non-transitory computer-readable medium having computer-executable instructions for performing the various operations described herein. More particularly, the vehicle controller 32 may be installed within the vehicle 31 to perform one or more vehicle functions, such as security/alarm monitoring, remote keyless entry, and remote starting, for example, and it may also provide for vehicle immobilization for security or safety functionality. The first wireless communications device 33 may operate using a variety of different wireless communications formats, such as Bluetooth, RFID, wireless local area network (WLAN), ZigBee, Near Field Communication (NFC), dedicated short range communications, etc. Furthermore, the vehicle controller 32 and the first wireless communications device 33 may be installed in a wide variety of vehicles, such as cars, vans, SUVs, trucks, motorcycles, etc., and also may be installed in both passenger and commercial vehicles. The vehicle controller 32 and the first wireless communications device 33 may share a common housing (i.e., they are part of the same unit), or they may be separately located in the vehicle 31.

The system 30 further illustratively includes one or more wireless security sensors 34. The wireless security sensor 34 illustratively includes a portable housing 35, a motion sensor 36 carried by the portable housing to detect motion thereof, a second wireless communications device 37 carried by the portable housing to communicate with the first wireless communications device 33, and a sensor controller 38 carried by the portable housing. In the illustrated example, the wireless security sensor 34 also illustratively includes a battery 39 carried by the portable housing 35 and powering the motion sensor 36, second wireless communications device 37 and sensor controller 38. The second wireless communications device 37 may operate using the same wireless communications formats discussed above with respect to the first wireless communications device 33. The sensor controller 38 may also be implemented using appropriate hardware (e.g., a microprocessor) and associated non-transitory computer-readable medium having computer-executable instructions for causing the sensor controller to perform the various operations discussed herein.

The portable housing 35 may be a rigid plastic housing, for example, although other suitable materials may also be used. Moreover, in some embodiments, the portable housing 35 may be sealed (e.g., via one or more seals or gaskets) so that it is moisture resistant to help prolong the life of the various components of the wireless security sensor 34, particularly when used outside of the passenger compartment of the vehicle 31, as will be discussed further below. In one example embodiment, the portable housing 35 may be a completely sealed and disposable unit. In accordance with one example embodiment, the portable housing 35 may have dimensions of about 1"×5/8"×1/2", although larger or smaller sizes and different portable housing shapes (e.g., rectangular, square, circular, etc.) may also be used in different embodiments. Various approaches may be used for mounting the portable housing 35. For example, the portable housing 35 may have a tab for screw mounting, or a separate carrier may be mounted at the desired location and the portable housing is coupled or plugged into the carrier. Other approaches may also be used, such as adhesives or adhesive strips, hook and loop fasteners, suction cups, etc.

Figure 7:
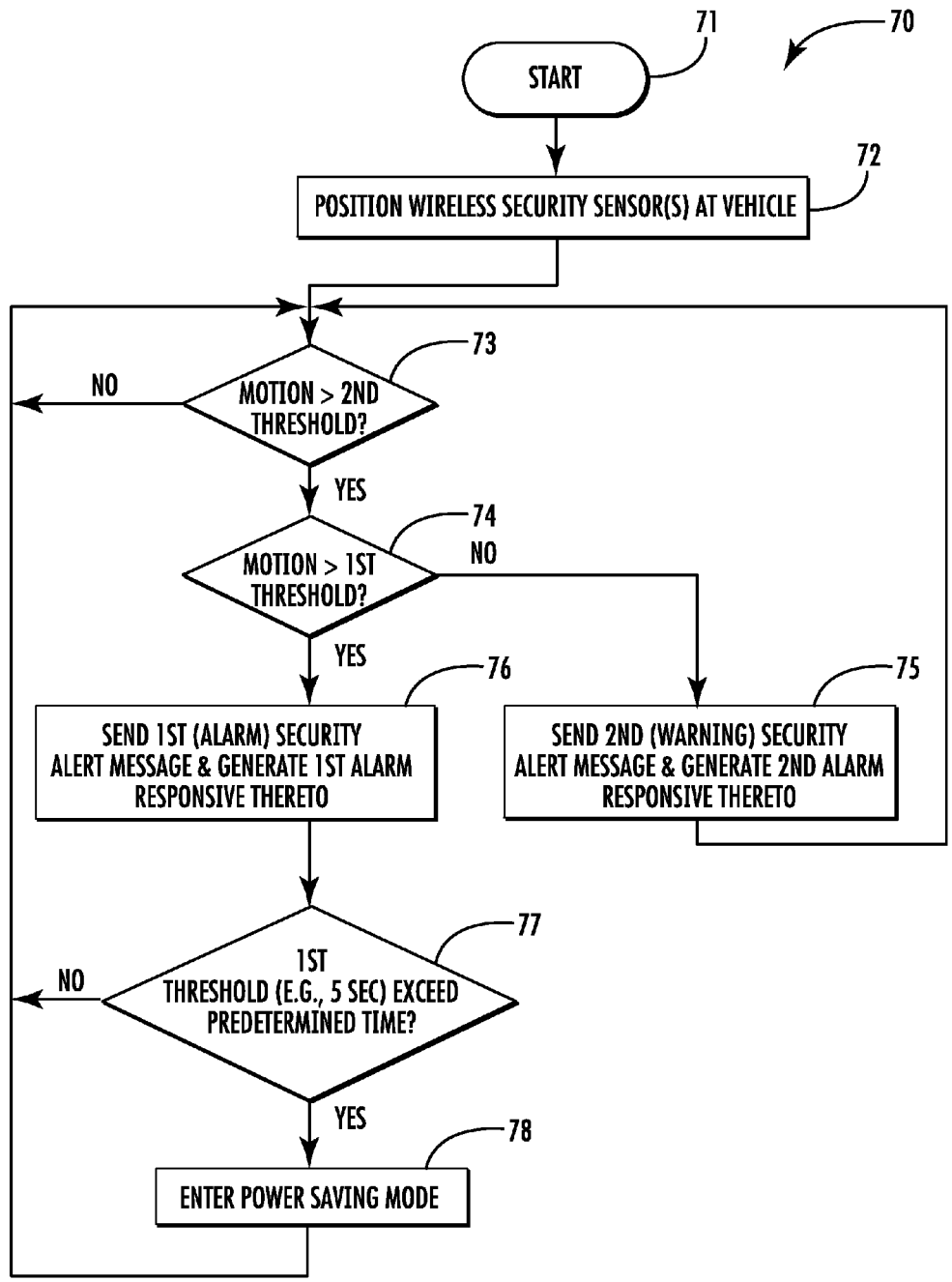
FIG. 7 is a flow diagram illustrating method aspects associated with one or more of the systems described herein.

Referring additionally to the flow diagram 70 of FIG. 7, operation of the various components of the system 30 will now be described. Beginning at Block 71, one or more wireless security sensors 34 are positioned at the vehicle 31. More particularly, the wireless security sensor 34 may be placed in various locations at the vehicle. For example, the wireless security sensor 34 may be placed within a passenger compartment of the vehicle 31, within a trunk or other storage area of the vehicle (e.g., inside the lids of tool boxes or cargo carriers integrated in or attached to the vehicle), in the engine compartment, etc., as well as on objects in any of these locations.

Further still, the wireless security sensor 34 may also advantageously be positioned on items carried by or otherwise coupled to the vehicle 31. In other words, as used herein, "at the vehicle" means that the wireless security sensor 34 may be carried by or adjacent to the vehicle 31, and does not have to be physically connected to the vehicle. For example, in the example embodiment illustrated in FIG. 2, a wireless security sensor 34 is coupled to a personal water craft 40 carried on a trailer 41 that is being towed by the vehicle 31 (which in the illustrated example is a pickup truck). The wireless security sensor 34 may be positioned on the exterior of the personal water craft 40, or inside a storage or engine compartment, for example. In some embodiments, a wireless security sensor(s) 34 may also be coupled to the trailer 41. Moreover, the wireless security sensor 34 may be attached to other kinds of trailers or towables as well (e.g., boat trailers, utility trailers, recreational vehicles, etc.), as well as different items that are carried on such trailers or on the vehicle itself. For example, these may include (but are not limited to) the following: boat accessories or components; lawn maintenance equipment; commercial equipment such as tools or machines; motorized vehicles such as motorcycles, dirt bikes, go-carts, all terrain vehicles (ATVs), utility vehicles (UTVs); furniture or household items; etc.

Moreover, the wireless security sensor 30 may also be positioned on exterior portions of the vehicle 31, such as in or on a rear view mirror, hubcaps, etc. In accordance with another example illustrated in FIG. 3, the vehicle 31 is an SUV with a spare tire 42 carried on the hatchback door. The wireless security sensor 34 is positioned on the spare tire 42, for example, on the back side of the wheel so that it is only accessible when the tire is removed from the vehicle 31. In this way, the wireless security sensor 34 cannot be accessed without the tire being moved.

More particularly, the motion sensor 36 may be a three-dimensional (3D) accelerometer or a tilt sensor, for example, which is configured to detect its own movement, i.e., movement of the portable housing 35. For example, the motion sensor 36 may detect its own tilt and/or lateral motion measured in degrees, and communicate the amount of motion or movement (e.g., how many degrees) and the associated direction or axis/axes of movement to the sensor controller 38. The motion sensor 36 may further detect vibration from impact. In other words, the motion sensor 36 is generally capable of detecting environmental changes such as lateral motion measured by distance, change or angle or vibration for use in determining when an alarm or warning condition has occurred, as will be discussed further below.

As such, the sensor controller 38 may be configured or programmed to cooperate with the motion sensor 36 and the second wireless communications device 37 to determine when motion of the portable housing exceeds one or more security alert thresholds. In the example illustrated in FIG. 7, a first security alert threshold is used to detect an alarm condition (full alarm), while a second security alert threshold (which is lower than the first security alert threshold) is used to detect a warning condition (sometimes called a "pre-warn"). More particularly, if the motion detected by the motion sensor 36 is greater than the second security alert threshold, at Block 73, but does not exceed a first security alert threshold, then the sensor controller 38 causes the second wireless communications device 37 to send a second (i.e., warning) security alert message to the vehicle controller 32, at Block 75.

The vehicle controller 32 may be configured to generate a second alarm (e.g., a warning alarm) responsive to the second security alert message. By way of example, the second alarm may be one or more short chirps or beeps of a siren, speaker, or vehicle horn, although other forms of the second alarm may also be used (e.g., a recorded or digitized message is played over a speaker, etc.). In this way, someone touching the item to which the wireless security sensor 34 is mounted will receive a warning indication that the item is associated with a vehicle security system, and that further action will result in a full alarm condition.

In this regard, when motion detected by the motion sensor 36 exceeds the first security alert threshold, then the sensor controller 38 determines that an alarm condition has been triggered (Block 74), at which point a first (alarm) security alert message is sent from the sensor controller 38 to the vehicle controller 32 via the first and second wireless communications devices 33, 37, which in turn causes the vehicle controller 32 to generate a first alarm responsive to the first security alert message, at Block 76. By way of example, the second security alert threshold may be in a range of 1-2° of motion, while the first security alert threshold may be in a range of a 2-4° of motion detected by the motion sensor 36. However, it will be appreciated that other measures of motion and threshold ranges may be used in different embodiments, and that a warning threshold need not be used in all embodiments. Generally speaking, the ranges should be set in accordance with the given implementation to help avoid false positives with respect to the alarm (i.e., first) threshold. In this regard, the wireless security sensor 34 may optionally include an input device (not shown) in some embodiments, such as a switch or dial, to adjust the threshold levels, if desired. Other approaches may also be used, as will be discussed below.

By way of example, the first alarm may comprise one or more of a local audible alarm (e.g., using a siren, horn, speaker, etc., at the vehicle 31), and a local visual alarm (e.g., using vehicle headlights, tail lights, brake lights, LEDs, etc.). In accordance with another example implementation, the first alarm may also (or instead) include a wireless alarm transmission, such as to a smartphone or other mobile wireless communications device over a cellular network, for example. This may be done via a text message, electronic mail (email) message, automated phone call, etc. Moreover, the wireless alarm transmission may be to a security monitoring service or center that may in turn take steps to notify the owner of the vehicle and/or law enforcement of the alarm, for example. In this regard, the vehicle controller 32 may include or have associated therewith a location determining device (e.g., GPS receiver, etc.) that provides a current location of the vehicle responsive to the alarm condition. Other forms of alerts or messages may also be used in certain embodiments. The first alarm may also trigger vehicle immobilization in some embodiments, if desired.

Furthermore, in some embodiments the sensor controller 38 may further determine when the first security alert threshold is exceeded for a predetermined time, at Block 77, and enter a power saving mode based thereon, at Block 78. More particularly, when movement is detected by the motion sensor 36 for a continuing duration (e.g., more than two seconds, and in some embodiments five seconds or longer), this will typically indicate that the vehicle 31 is moving. Presuming that the vehicle controller 31 will prevent movement of the vehicle as a result of theft, then continued movement of the vehicle 31 indicates that the owner or authorized user of the vehicle has disarmed the vehicle controller 32 and is driving. In such case, the theft risk for the item to which the wireless security sensor 34 is attached is de minimis, so the sensor controller 38 may enter the power saving mode to reduce power consumption from the battery 39, and to help extend the life of the battery. By way of example, the battery 39 may be either a single-use or rechargeable battery (or batteries), depending on the given implementation.

Figure 4:
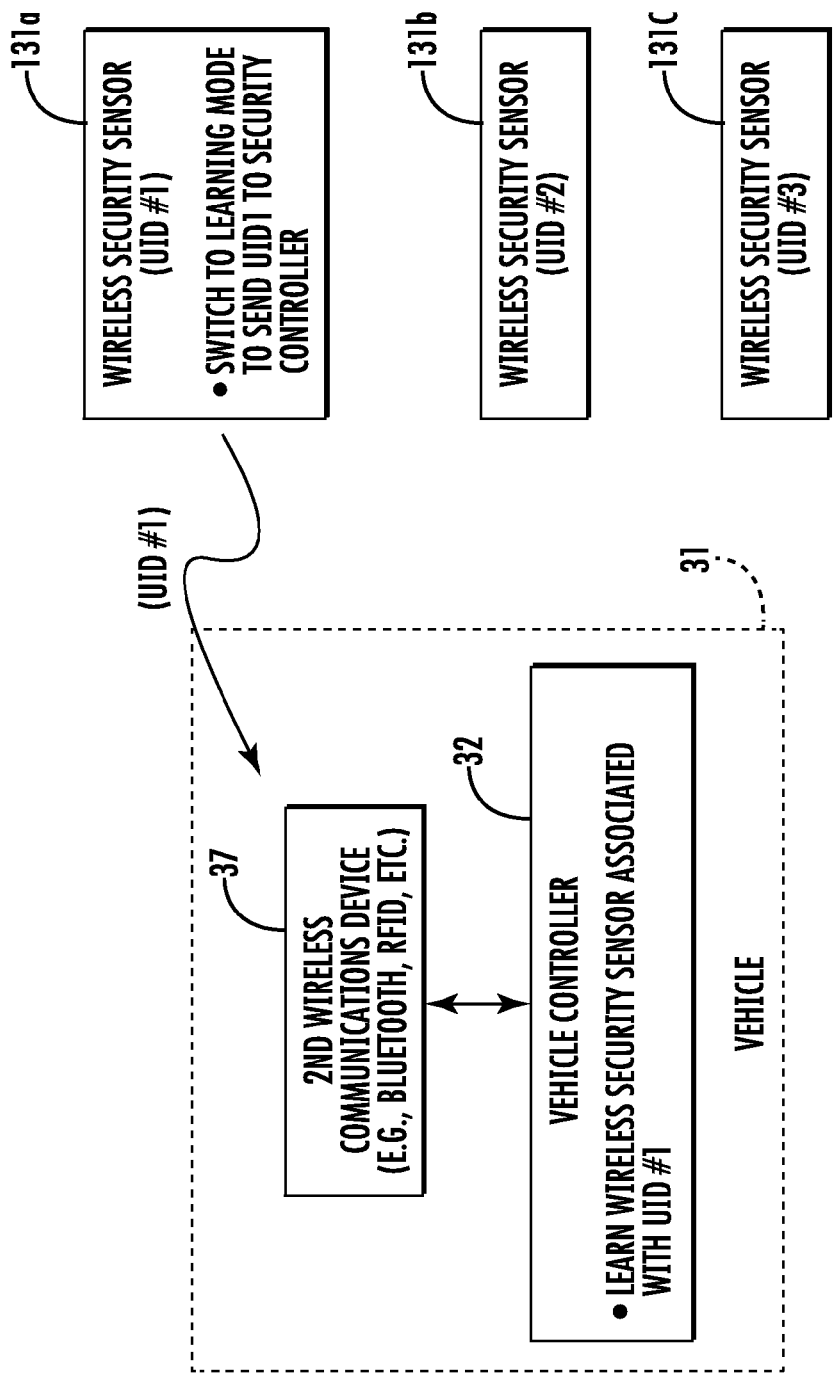
FIG. 4 is a schematic block diagram of the system of FIG. 1 in accordance with an example embodiment in which a plurality of wireless security sensors are included and are learned by the vehicle controller based upon respective unique identifiers (UIDs) thereof.

Referring now additionally to FIG. 4, in certain embodiments a plurality of wireless security sensors 134a-134c may be used with a given vehicle controller 32. In the illustrated example, there are three wireless security sensors 134a-134c, which are similar to the wireless security sensor 34 described above. Moreover, each of the wireless security sensors 134a-134c has a unique identifier (UID) associated therewith, which in the present example are UID #1, UID #2, and UID #3, respectively. Moreover, the sensor controller of each of the wireless security sensors 134a-134c (not shown in FIG. 4) may be switchable to a learning mode to send its respective UID to the vehicle controller 32, which may accordingly learn the wireless security sensor.

In this regard, different wireless security sensors 134a-134c may be learned for, or assigned to, different locations at the vehicle 31 (e.g., sensor 131a is assigned to the spare tire, sensor 131b is assigned to an attached trailer, etc.), so that alert messages may be customized to the particular alert condition that is occurring (e.g., "spare tire sensor alarm has been triggered"). Various approaches may be used for placing the wireless security sensors 134a-134c into the learning mode, such as a programming switch or button, or using a specified pattern of motion that is recognized to initiate the learning mode (e.g., shaking the sensor back and forth for a given period of time, moving in a particular pattern of up/down and left/right, etc.), which may be acknowledged by a chirp by the vehicle controller 32, for example. However, other suitable approaches for interfacing with the wireless security sensors 134a-134c to place them into the learning mode (or otherwise interface with them for firmware updates, diagnostics, etc.) may be used, such as through a short-range interface (e.g., NFC, Bluetooth, etc.) to a mobile device running a sensor control app, etc. The vehicle controller 32 may be placed in its learning mode using common techniques such as those used for learning RKE FOBs, etc. (e.g., via a plug in port, wireless interface, etc.). Moreover, the wireless security sensors 134a-134c may have an audible (or visual) indicator for use with testing, calibration, learning, or other operations, in accordance with an example embodiment.

Figure 5:
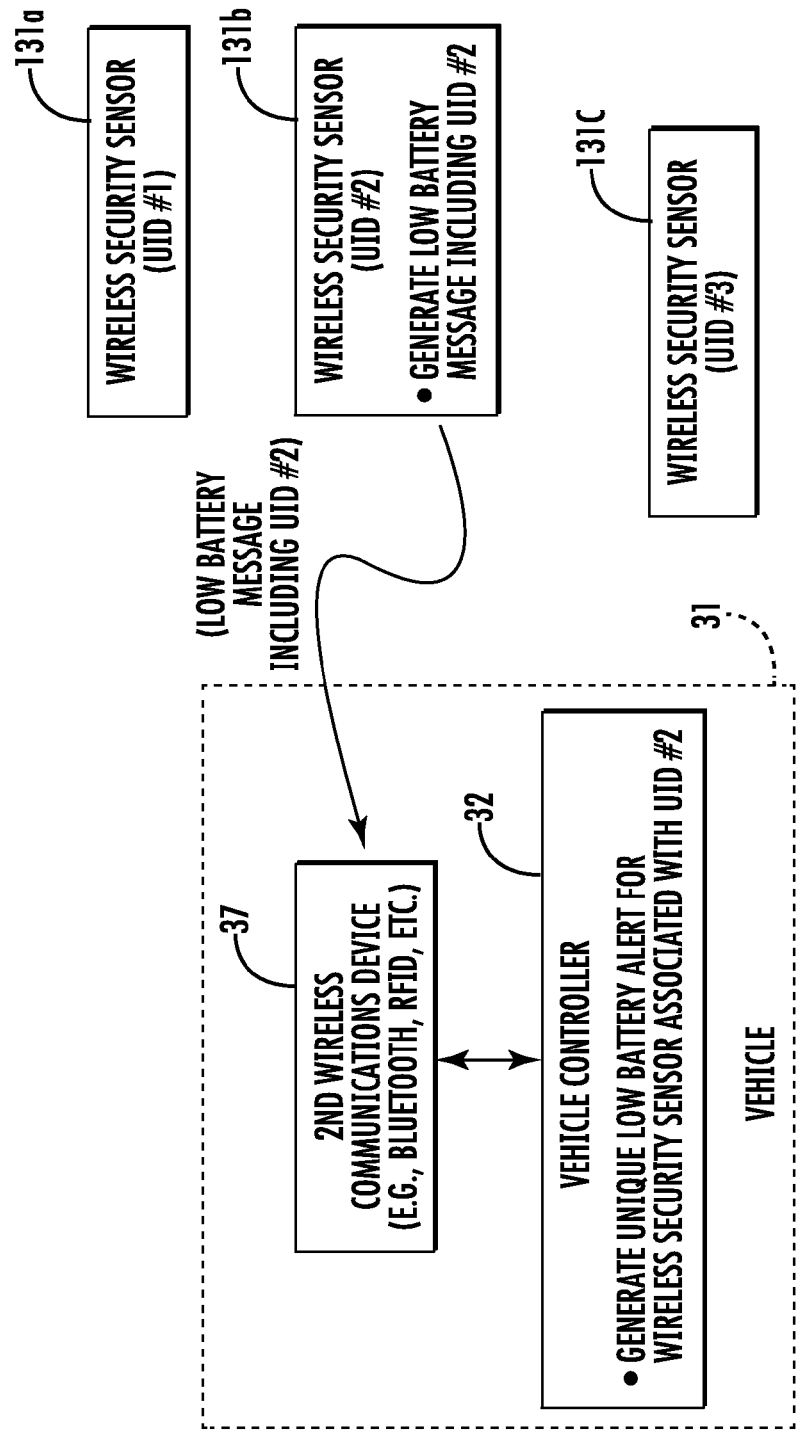
FIG. 5 is a schematic block diagram of the system of FIG. 4 in which the plurality of wireless security sensors provide low battery messages including their respective UIDs.

Turning now to FIG. 5, in some embodiments the sensor controllers of the wireless security sensors 134a-134c may generate a low battery message including the respective UID of the associated wireless security sensor when its battery power level falls below a given threshold. As such, the vehicle controller 32 may accordingly generate a unique low battery alert for each respective wireless security sensor 134a-134c based upon its UID. For example, the alert may be a chirp of a horn, siren, or speaker upon starting (or stopping/parking) of the vehicle 31, for example. More particularly, the number of chirps may correspond to the UID number assigned to the respective wireless security sensor 134a-134c (e.g., one chirp for low battery in the sensor 131a, two chirps for low battery in sensor 131b, etc.). In some embodiments, a wireless message may be sent to the user (e.g., via a cellular network or Bluetooth link) from the vehicle controller 32 so the user gets an indication of which sensor 134a-134c has issued a low battery warning. Knowing the specific wireless security sensor 134a-134c that has a low battery allows the user to change or charge only that battery, and save time (and potentially money) not changing or charging all of the other batteries if multiple wireless security sensors are being used. In other embodiments, the vehicle controller 32 may integrate with a display in the vehicle to provide such a warning (as well as other messages or information described herein).

Figure 6:
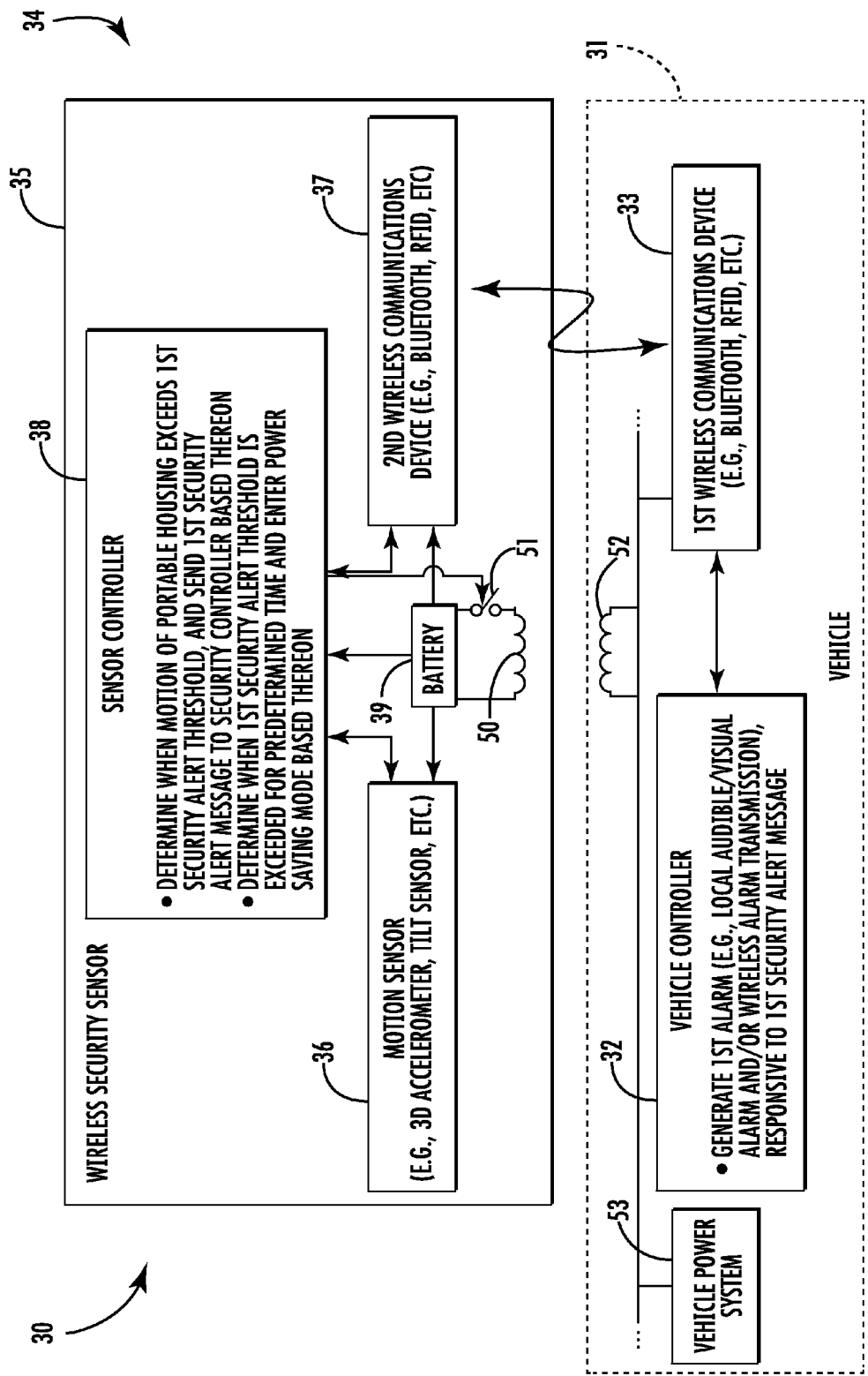
FIG. 6 is a schematic block diagram of another example embodiment of the system of FIG. 1 including an inductive charging circuit within the portable housing of the wireless security sensor.

Referring additionally to FIG. 6, in accordance with another example embodiment, the wireless security sensor 34 further illustratively includes an inductive charging circuit 50 carried by the portable housing 35 and cooperating with the sensor controller 38 to inductively charge the battery 39, e.g., via a switch 51. More particularly, another inductive charging circuit 52 may be coupled to a power system 53 of the vehicle 31. By way of example, in the embodiment illustrated in FIG. 3, the inductive charging circuit 52 may be positioned on the hatchback or spare tire carrier, such that when the wireless security sensor 34 is mounted on the spare tire the two circuits are in close proximity to allow inductive charging of the battery 39. Of course, the inductive charging circuit 52 may be located elsewhere on the vehicle 31 as well. In accordance with another example embodiment where the wireless security sensor 34 is to be attached to a trailer, for example, the inductive charging circuit 52 may also be attached to the trailer in the appropriate location and coupled to the vehicle power system 53 via the trailer light wiring, which plugs into the vehicle. Again, other placements and arrangements of the inductive charging circuits 50, 52 will be appreciated in view of the various embodiments discussed above.

In the above embodiments, only one-way communications from the sensor controller 38 to the vehicle controller 32 were discussed. However, it should be noted that in some embodiments, two-way communication may be used. That is, the vehicle controller 32 may send commands or responses to the wireless security sensor 34 to perform various functions. For example, in the context of an alarm monitoring application, the vehicle controller 32 may inform the wireless security sensor(s) 34 when it has been disarmed by the user, so that the wireless security sensor(s) may enter the power saving mode accordingly. Conversely, the vehicle controller 32 may inform the wireless security sensor(s) 34 when it has been armed, so that it too may enter an armed mode.

The vehicle controller 32 may also communicate with the sensor controller 38 to check diagnostics (battery charge, etc.), change settings (e.g., motion thresholds or time to enter the power saving mode), etc. Moreover, with two-way communication, the vehicle controller 32 may "look" for learned wireless security sensors 34 when it is placed in an armed mode, and if one or more learned wireless security sensors are not present (e.g., a sensor on trailer is not found because the trailer is not attached to the vehicle 31), then the vehicle controller may accordingly bypass a zone associated with that sensor until the next time the vehicle controller is armed. Moreover, with two-way communication a plurality of the wireless security sensors 34 may form an ad-hoc network to communicate with one another and potentially extend the range of outlying sensors with respect to the vehicle controller 32, for example.

In some example embodiments, the sensor controller 38 in conjunction with the motion sensor 36 and second wireless communications device 37 may be used to determine and communicate a security threat level based on detected lateral movement or vibration. The sensor controller 38 in conjunction with the motion sensor 36 and second wireless communications device 37 may also be used to determine and communicate a threat condition in relation to the engine starting on a vehicle equipped with a manual (or automatic) transmission to determine undesired movement. It is to be understood that the motion sensor 36 and the second wireless communication device 37 may be used to communicate just the detected lateral movement or vibration to the vehicle controller 32. In this case, the determination of the security threat level or safety threat condition may be made by the vehicle controller 32, for example.

In some example embodiments, a "dummy" wireless security sensor may be used that reports its raw data to the vehicle controller 32. In this case, the vehicle controller 32 could perform the requisite calculations to determine whether a movement threshold has been exceeded, etc.

The vehicle controller 32 may be wired to the vehicle power system 53 (and, more particularly, to the main battery of the vehicle), and may in some instances have a backup power source (i.e., a separate dedicated battery). Moreover, in some embodiments more than one first wireless communications device may be associated with the vehicle controller 32, e.g., one for remote transmitters or FOBs, and the other for the wireless security sensor(s) 34. It is to be further understood that the first wireless communications device 33 may not be an original part of the vehicle controller 32. For example, the first wireless communications device 33 may be plugged into the vehicle controller 32.

As noted above, the vehicle controller 32 in some embodiments may send communications to the sensor controller 38. These communications may include detection parameters such as sensitivity thresholds for environmental change, and/or operational commands to perform functions such as enabling or disabling the wireless security sensor 34.

It will be appreciated that various aspects may be embodied as a system, method or non-transitory computer-readable medium. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more non-transitory computer-readable medium(s) having computer-readable program code embodied thereon.

Any combination of one or more non-transitory computer-readable medium(s) may be utilized. The non-transitory computer-readable medium may be a computer-readable signal medium or a computer-readable storage medium. A non-transitory computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A non-transitory computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A non-transitory computer-readable signal medium may be any computer-readable medium that that can communicate, propagate, or transport a program for use by or in connection with an instruction execution system, apparatus, or device.

Program code embodied on a non-transitory computer-readable medium may be transmitted using any appropriate medium, including but not limited to wireless, wireline, optical fiber cable, RF, etc., or any suitable combination of the foregoing.

Computer program code for carrying out operations for aspects of the present embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various aspects are described with reference to flowchart illustrations and/or block diagrams of methods, apparatus (systems) and computer program products according to different embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer, other programmable data processing apparatus, or other devices to function in a particular manner, such that the instructions stored in the computer-readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the form disclosed.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A vehicle security system comprising:
   a vehicle controller carried by the vehicle;
   a first wireless communications device carried by the vehicle and coupled to said vehicle controller;
   at least one wireless security sensor comprising
     a portable housing,
     a motion sensor carried by said portable housing to detect motion thereof,
     a second wireless communications device carried by said portable housing to communicate with said first wireless communications device, and
     a sensor controller carried by said portable housing and configured to cooperate with said motion sensor and said second wireless communications device to
       determine when motion of said portable housing exceeds a first security alert threshold, and send a first security alert message to said vehicle controller based thereon, and
       determine when the first security alert threshold is exceeded for a predetermined time and enter a power saving mode based thereon, and
     a battery carried by said portable housing and powering said motion sensor, second wireless communications device and sensor controller;
   said vehicle controller generating a first alarm responsive to the first security alert message.

2. The vehicle security system of claim 1 wherein said at least one wireless security sensor has a unique identifier (UID) associated therewith.

3. The vehicle security system of claim 2 wherein said sensor controller is switchable to a learning mode to send the UID to said vehicle controller.

4. The vehicle security system of claim 2 wherein said at least one wireless security sensor comprises a plurality thereof.

5. The vehicle security system of claim 4 wherein said sensor controller generates a low battery message including the UID of the associated wireless security sensor; and wherein said vehicle controller generates a unique low battery alert for each respective wireless security sensor based upon its UID.

6. The vehicle security system of claim 1 wherein said sensor controller is further configured to determine when motion is above a second security alert threshold lower than said first security alert threshold and send a second security alert message to said first wireless communications device based thereon; and wherein said vehicle controller is configured to generate a second alarm responsive to the second security alert message.

7. The vehicle security system of claim 1 wherein the predetermined time is greater than 2 seconds.

8. The vehicle security system of claim 1 wherein said motion sensor comprises a three dimensional (3D) accelerometer.

9. The vehicle security system of claim 1 wherein said motion sensor comprises a tilt sensor.

10. The vehicle security system of claim 1 wherein said at least one wireless security sensor further comprises an inductive charging circuit carried by said portable housing and cooperating with said sensor controller to inductively charge said battery.

11. The vehicle security system of claim 1 wherein said vehicle controller comprises at least one of a remote start controller, an alarm system controller, and a remote keyless entry controller.

12. The vehicle security system of claim 1 wherein the first alarm comprises at least one of a local audible alarm, and a local visual alarm.

13. The vehicle security system of claim 1 wherein the first alarm comprises a wireless alarm transmission.

14. A wireless security sensor for use with a vehicle security system comprising a vehicle controller carried by a vehicle and a first wireless communications device carried by the vehicle and coupled to the vehicle controller, the wireless security sensor comprising:
   a portable housing;
   a motion sensor carried by said portable housing to detect motion thereof;
   a second wireless communications device carried by said portable housing to communicate with the first wireless communications device;
   a sensor controller carried by said portable housing and configured to cooperate with said motion sensor and said second wireless communications device to
     determine when motion of said portable housing exceeds a first security alert threshold, and send a first security alert message to said vehicle controller based thereon to cause the vehicle controller to generate a first alarm,
     determine when the first security alert threshold is exceeded for a predetermined time and enter a power saving mode based thereon; and
   a battery carried by said portable housing and powering said motion sensor, second wireless communications device and sensor controller.

15. The wireless security sensor of claim 14 wherein said at least one wireless security sensor has a unique identifier (UID) associated therewith.

16. The wireless security sensor of claim 15 wherein said sensor controller is switchable to a learning mode to send the UID to the vehicle controller.

17. The wireless security sensor of claim 14 wherein said sensor controller generates a low battery message including a UID associated with the wireless security sensor.

18. The wireless security sensor of claim 14 wherein said sensor controller is further configured to determine when motion is above a second security alert threshold lower than the first security alert threshold and send a second security alert message to the first wireless communications device based thereon; and wherein the vehicle controller is configured to generate a second alarm responsive to the second security alert message.

19. The wireless security sensor of claim 14 wherein said motion sensor comprises a three dimensional (3D) accelerometer.

20. The wireless security sensor of claim 14 wherein said motion sensor comprises a tilt sensor.

21. A method for using a vehicle security system comprising a vehicle controller carried by a vehicle and a first wireless communications device carried by the vehicle and coupled to the vehicle controller, the method comprising:
positioning at least one wireless security sensor at the vehicle, the at least one wireless security sensor comprising a portable housing, a motion sensor carried by the portable housing to detect motion thereof, a second wireless communications device carried by the portable housing to communicate with the first wireless communications device, a sensor controller carried by the portable housing and coupled to the motion sensor and the second wireless communications device, and a battery carried by the portable housing and powering the motion sensor, the second wireless communications device, and the sensor controller;
using the sensor controller to determine when motion of the portable housing exceeds a first security alert threshold based upon the motion sensor, and to send a first security alert message to the vehicle controller based thereon via the second wireless communications device;
using the sensor controller to determine when the first security alert threshold is exceeded for a predetermined time based upon the motion sensor, and enter a power saving mode based thereon; and
generating a first alarm using the vehicle controller responsive to the first security alert message.

22. The method of claim 21 wherein the at least one wireless security sensor has a unique identifier (UID) associated therewith.

23. The method of claim 22 further comprising switching the sensor controller to a learning mode to send the UID to the vehicle controller.

24. The method of claim 22 wherein the at least one wireless security sensor comprises a plurality thereof.

25. The method of claim 24 further comprising:
causing the sensor controller to generate a low battery message including the UID of the associated wireless security sensor; and
causing the vehicle controller to generate a unique low battery alert for each respective wireless security sensor based upon its UID.

26. The method of claim 21 further comprising:
causing the sensor controller to determine when motion is above a second security alert threshold lower than the first security alert threshold and send a second security alert message to the first wireless communications device based thereon; and
causing the vehicle controller to generate a second alarm responsive to the second security alert message.

\* \* \* \* \*